United States Patent [19]

Dutz et al.

[11] 4,017,269
[45] Apr. 12, 1977

[54] METHOD AND ARRANGEMENT FOR GASIFYING FINELY DIVIDED FLUIDIZED SOLID COMBUSTIBLE MATERIAL

[75] Inventors: Karl-Heinz Dutz, Herten; Adolf Linke, Essen, both of Germany

[73] Assignee: Krupp-Koppers GmbH, Essen, Germany

[22] Filed: May 22, 1975

[21] Appl. No.: 579,816

Related U.S. Application Data

[63] Continuation of Ser. No. 345,204, March 26, 1973, abandoned.

[30] Foreign Application Priority Data

Mar. 25, 1972 Germany .......................... 2214737

[52] U.S. Cl. .................................. 48/86 R; 48/87;
 48/197 R; 48/DIG. 4; 110/101 C; 110/101
 CB; 214/18.2; 302/35; 431/90
[51] Int. Cl.² .......................................... C10J 3/50
[58] Field of Search ............... 48/101, 191, 197 R,
 48/203, 206, 210, 192, DIG. 4, 89, 106, 63,
 77, 86, 87, 190, 202, 76; 23/230 A, 253 A;
 137/7, 8, 12, 88, 111, 114; 260/698; 110/28
 C, 101 C, 101 CB, 101 CF; 302/35; 241/31,
 33; 431/90; 266/28; 214/18.2; 222/57

[56] References Cited

UNITED STATES PATENTS

| 2,059,411 | 5/1969 | Stubblefield et al. | 431/90 |
|---|---|---|---|
| 2,698,227 | 12/1954 | Peery et al. | 48/206 |
| 2,792,070 | 5/1957 | Strunk | 48/191 |
| 2,871,114 | 1/1959 | Eastman | 48/206 |
| 2,919,980 | 1/1960 | Klapp et al. | 48/63 |
| 2,925,335 | 2/1960 | Donath | 48/206 |
| 2,962,094 | 11/1960 | Wallace | 431/90 |
| 3,106,239 | 10/1963 | Jansen et al. | 431/90 |
| 3,128,129 | 4/1964 | Stine et al. | 302/35 |
| 3,165,399 | 1/1965 | Kennedy | 431/90 |
| 3,210,181 | 10/1965 | Manny | 431/90 X |
| 3,443,576 | 5/1969 | Kervin | 137/88 |
| 3,516,429 | 6/1970 | Sandstede et al. | 137/12 |
| 3,711,256 | 1/1973 | Williams | 48/180 R |

OTHER PUBLICATIONS

"The Continuous Pressure Gasification of Pulverized Coal in Suspension", Fredersdorff et al.; American Gas Association; May, 1952; pp. 1–4.
"Pressure Feeder for Powdered Coal or Other Finely Divided Solids", Barker et al.; Engineering and Process Development; 5–51.
"Pilot Plant Gasification of Pulverized Coal with Oxygen and Highly Superheated Steam", Strimbeck et al.; Bureau of Mines; 11–50.

Primary Examiner—S. Leon Bashore
Assistant Examiner—Peter F. Kratz
Attorney, Agent, or Firm—Michael J. Striker

[57] ABSTRACT

The arrangement includes a source of finely divided solid combustible material fluidized in an inert gas, and also a source of combustion-supporting gas, such as oxygen, air, or oxygen-enriched air. A gasifier is provided for gasifying finely divided solid combustible material by reacting the same with combustion-supporting gas, and the gasifier has one or more inlets. A first conduit connects the source of combustible material to an inlet of the gasifier. A second conduit connects the source of combustion-supporting gas to an inlet of the gasifier. A pressure-regulating unit is automatically operative for maintaining the pressure of fluidized combustible material entering the gasifier higher than the pressure of combustion-supporting gas entering the gasifier and higher than the pressure of gases in the gasifier, to prevent the combustion-supporting gas and also the gases in the gasifier from passing out of the gasifier into the first conduit and becoming mixed with fluidized combustible material before such combustible material can enter the gasifier.

20 Claims, 3 Drawing Figures

METHOD AND ARRANGEMENT FOR GASIFYING FINELY DIVIDED FLUIDIZED SOLID COMBUSTIBLE MATERIAL

This is a continuation of application Ser. No. 345,204, filed Mar. 26, 1973 and now abandoned.

BACKGROUND OF THE INVENTION

The invention relates to methods and arrangements for gasifying finely divided solid combustible material.

Gasifiers are already known for gasifying finely divided solid combustible material by mixing the same with a combustion-supporting gas such as air, oxygen-enriched air or pure oxygen. The combustible material is reacted with the combustion-supporting gas, sometimes with the addition of steam, so that the combustible material becomes partially combusted, producing a gas mixture containing carbon monoxide and hydrogen. The gasifying process can be successfully performed at very low pressures, for example only slightly above atmospheric pressure, and also at high pressures, such as between about 2 and 80 atm.

Persons familar with gasification techniques are well aware that finely divided solid combustible material, such as coal dust, is highly reactive and will explode with great force if oxygen is present. The explosion can be triggered by the smallest spark. For this reason it is necessary to keep the combustible material removed from combustion-supporting gas until the combustible material enters the gasifier. This can be accomplished by maintaining the combustible material in an environment of inert gas, such as nitrogen or other gas incapable of supporting combustion. If the finely divided solid combustible material is fluidized, for ease of handling, then the fluidizing gas employed will be the inert gas just mentioned. If inert fluidizing gas is employed in this manner it becomes possible to prevent the combustible material from becoming mixed with combustion-supporting gas until the combustible material is actually delivered to the gasifier, or mixed with combustion-supporting gas in some other controlled manner.

Despite the use of an inert gas for fluidizing finely divided solid combustibles, the possibility of such combustibles becoming mixed with combustion-supporting gas still exists. Specifically, a conduit necessarily leads from the source of fluidized combustible material to an inlet of the gasifier, and another conduit leads from the source of combustion-supporting gas to the gasifier. It is possible, therefore, for combustion-supporting gas to enter the conduit leading from the source of combustible material and become mixed with combustibles before the combustibles have entered the gasifier. As explained above, this is exceedingly dangerous.

SUMMARY OF THE INVENTION

It is the general object of the invention to provide a method and an arrangement for gasifying finely divided solid combustible material according to which the possibility of combustible material becoming mixed in an uncontrolled manner with combustion-supporting gas, prior to entry of the combustible material into the gasifier, is prevented.

This object, and others which will become more understandable from the following description, can be met according to the invention by an arrangement which comprises, briefly stated, a source of finely divided solid combustible material fluidized in an inert gas, and also a source of combustion-supporting gas. Gasifying means is provided for gasifying finely divided solid combustible material by reacting the same with combustion-supporting gas, and the gasifying means is provided with one or more inlets. First conduit means connects the source of combustible material to an inlet of the gasifying means, and second conduit means connects the source of combustion-supporting gas to an inlet of the gasifying means. Pressure-regulating means is automatically operative for maintaining the pressure of fluidized combustible material entering the gasifying means higher than the pressure of combustion-supporting gas entering the gasifying means and also higher than the pressure of gases in the gasifying means, to prevent the combustion-supporting gas and also the gases in the gasifying means from passing out of the gasifying means into said first conduit means and becoming mixed with fluidized combustible material before such material enters the gasifying means.

It is contemplated according to the invention to monitor the difference in the pressure of the inert fluidizing gas and the pressure of the combustion-supporting gas, or alternatively to monitor the difference in the pressure of the inert fluidizing gas and the pressure of the gases issuing at the outlet of the gasifier. When the pressure difference departs from a predetermined value, a negative-feedback stabilizing system effects a corrective increase or decrease of the pressure of at least the inert fluidizing gas so that the predetermined desired value for the pressure difference can normally be maintained. In the event, however, that the pressure difference falls below a predetermined minimum acceptable pressure difference, then the delivery of fluidized combustible material to the gasifier and/or the delivery of combustion-supporting gas to the gasifier is terminated.

An arrangement for performing the method according to the invention includes pressure-sensing means responsive to the difference between the pressure prevailing in a conduit leading from a source of inert fluidizing gas to the source of fluidized combustible material and the pressure prevailing in the conduit leading from the source of combustion-supporting gas to the gasifying means. This pressure-sensing means cooperates with a negative-feedback valve-control means to form a negative feedback system for maintaining the just-mentioned pressure difference at a predetermined value. For example, the conduit supplying inert fluidizing gas to the fluidizing container may include a valve, and the negative feedback system may be operative for varying the pressure of fluidizing gas delivered to the fluidizing container in dependence upon the discrepancy between the actual value of the pressure difference and the predetermined value desired for the pressure difference.

Advantageously, the arrangement also includes shut-off means cooperating with the pressure-difference sensing means, and operative in the event the pressure difference falls below a predetermined minimum acceptable pressure difference for terminating delivery of combustible material to the gasifier and/or terminating delivery of combustion-supporting gas to the gasifier.

The novel features which are considered as characteristic for the invention are set forth in particular in the appended claims. The invention itself, however, both as to its construction and its method of operation, together with additional objects and advantages thereof, will be best understood from the following

DESCRIPTION OF THE PREFERRED EMBODIMENTS

Figure 1:
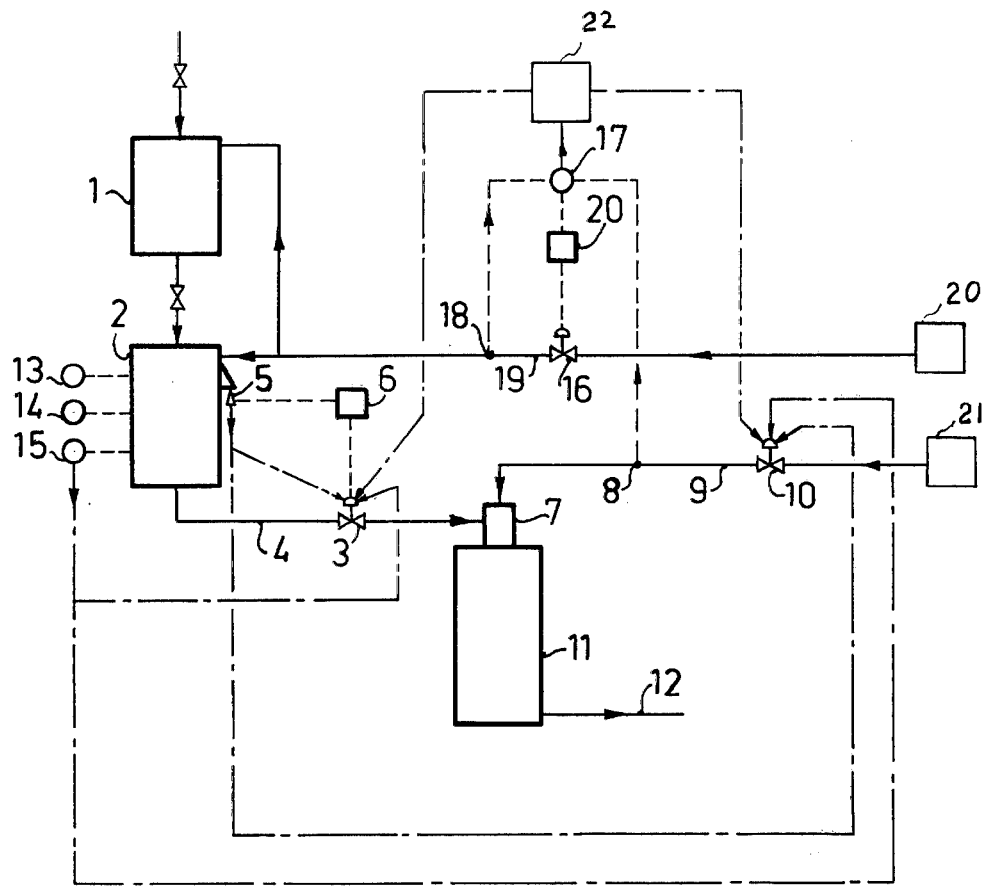
FIGS. 1–3 depict three different embodiments of the invention.

In the drawing, reference numeral 1 designates a buffer storage container for finely divided solid combustible material, such as coal dust or the like. The buffer storage container 1 is periodically filled and emptied, with the emptying taking place under pressure and with the filling taking place in the absence of applied pressure. The buffer storage container 1 supplies finely divided solid combustible material into the fluidizing container 2 where the combustible material is fluidized by injection of fluidizing gas. (The technique of fluidizing finely divided solids for purposes of easy handling is so well known that details of such techniques need not be set forth here.) The capacity of buffer storage container 1 is sufficiently great to accommodate a sufficient amount of finely divided combustibles to fill fluidizing container 2 to capacity at least once per complete emptying of container 1.

The fluidizing container 2 is supported on a weighing device illustrated only symbolically and designated by reference numeral 5. As will be understood by persons skilled in the art, the fluidized solids in the container 2 will have many of the physical properties of an ordinary liquid, and as the solids in container 2 are used up, the weight of the contents of container 2 decreases, reducing the weight sensed by weighing device 5.

In the illustrated embodiment a first conduit 4 leads from the source 2 of fluidized combustible material to an inlet of gasifying means 7, 11. Gasifying means 7, 11 comprises a burner 7 for reacting the combustible material with combustion-supporting gas, and also comprises a gasifying chamber 11 having an outlet 12 for gasified combustible material. During the gasifying operation, fluidized combustible material continuously flows out of the source 2 of fluidized material through the first conduit 4 and into the gasifier 7, 11.

Positioned in the first conduit 4 is an adjustable valve 3 for controlling the rate of passage of fluidized combustibles through the first conduit 4. Adjustment of valve 3 is automatically effected by negative-feedback control. Connected to the weighing device 5 is a negative-feedback regulating device 6. Device 6 (which advantageously may operate in a digital manner) determines the rate at which fluidized combustible material is leaving container 2 and generates an electrical signal proportional to such rate. The internal circuitry of device 6 compares this electrical signal with another electrical signal proportional to the predetermined desired rate for the outflow of fluidized combustibles, and subtracts the signals to form an error signal which is used to adjust the electrically controllable valve 3 in a sense reducing the error signal to zero, so that the predetermined desired outflow rate is normally maintained. The principles of negative feedback are so well known that detailed description of circuitry operative for maintaining the outflow rate at the pre-set desired value is not thought to be required. From the foregoing it will be appreciated that the instantaneous quantity of fluidized combustible material in the container 2 has no direct effect upon the rate at which fluidized combustibles are passed to the gasifier 7, 11.

The device G furthermore incorporates circuitry (also not illustrated because of a conventional nature) for closing off completely the valve 3 and/or the valve 10 controlling the flow of combustion gas, in the event that the delivery rate of combustible materials to the gasifier 7, 11 falls below a predetermined value, for instance due to system malfunction. (The circuitry for accomplishing this function can be entirely conventional, so that the device 6 may for instance include a Schmitt-trigger or other threshold-detector unit for monitoring the electrical signal representative of the delivery rate and generating an output signal when the delivery-rate signal falls below a predetermined value. Solenoids for controlling valves 3 and 10 could be connected to the output of the Schmitt trigger. However, many such expedients are possible).

The periodic filling and emptying of the fluidizing container 2 are respectively initiated in dependence upon the extent to which container 2 is filled at a particular time. For this purpose, three sensors 13, 14, 15 may be provided for monitoring the upper level of the body of fluidized gas. These sensors may be of a mechanical, electrical or photoelectric character and are, per se, conventional. When the upper level of the body of fluidized combustibles reaches the level of uppermost sensor 13, the filling of container 2 with finely divided solids is terminated, or slowed down. When the upper level of the body of fluidized combustibles reaches the level associated with sensor 14, indicating that container 2 has been emptied of combustibles to a considerable degree, the valve between containers 1 and 2 is opened to permit entry of additional combustible material into the fluidizing container 2. If the upper level of the body of fluidized combustibles reaches the level associated with lowest sensor 15, sensor 15 will generate a shut-off signal which it applies to valves 3 and 10, terminating the delivery of fluidized combustibles to the gasifier, and also terminating the delivery of combustion-supporting gas to the gasifier. Such shutoff is appropriate, inasmuch as the upper level of the body of fluidized combustibles should ordinarily not fall much below the level associated with sensor 14, if the arrangement is operating properly.

Instead of controlling the periodic filling of contaner 2 with combustibles by means of the three sensors 13, 14, 15, such control could also be effected using only the weighing device 5, with different predetermined weights resulting respectively in starting and stopping of the filling of container 2 and in shut-off of valves 3 and 10 in the event the upper level of fluidized combustibles falls too low.

So as to preclude the possibility of coal dust explosions, an inert gas, preferably nitrogen, is employed for the fluidizing of the combustible solids, for breaking up of such solids if necessary, for conveying the solids to the gasifier, and for creating a non-hazardous pressurized environment in the buffer storage container 1. Preferably, the combustible solids should not become mixed with the combustion-supporting gas delivered from source 21 until the solids and the gas reach burner 7. The possibility of permitting the combustibles and combustion-supporting gas to become mixed before entry into the burner 7 is not precluded according to the inventive concept, but such mixing would have to occur in a controlled manner precluding the possibility of explosions. Such mixing does not occur in the illustrated arrangement.

The source 21 of combustion-supporting gas, already referred to, is connected to an inlet of the gasifier 7, 11 by means of a second conduit 9. It is desired to prevent the combustion-supporting gas and/or other gases in the gasifier from entering the first conduit 4 and becoming mixed with the fluidized combustibles before the combustibles reach the gasifier. To accomplish this result, it is contemplated to maintain the pressure of fluidized combustibles entering the gasifier higher than the pressure of combustion-supporting gas entering the gasifier and higher than the pressure of gases in the gasifier. The specific embodiment illustrated accomplishes this aim by maintaining the pressure difference between the container 2 and the gasifier, and between the container 2 and the second conduit 9, above a predetermined minimum acceptable value, and normally at a predetermined optimum value.

Figure 2:
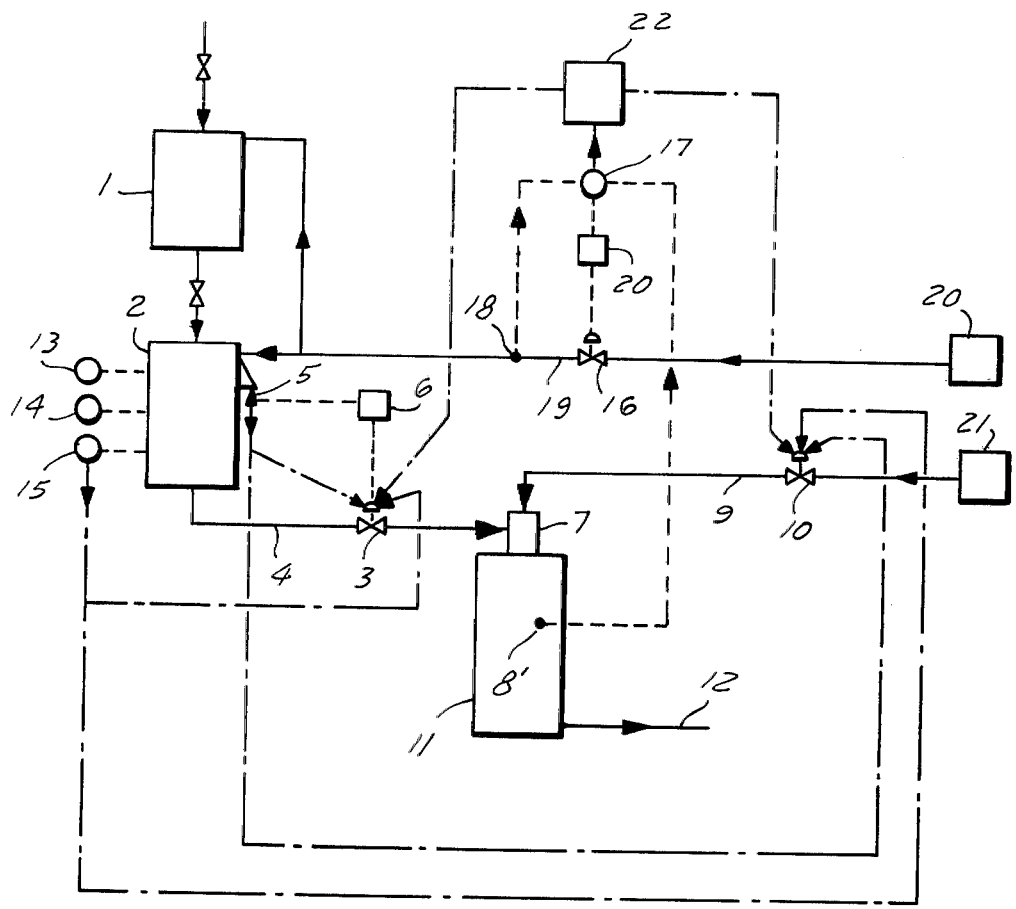
Figure 3:
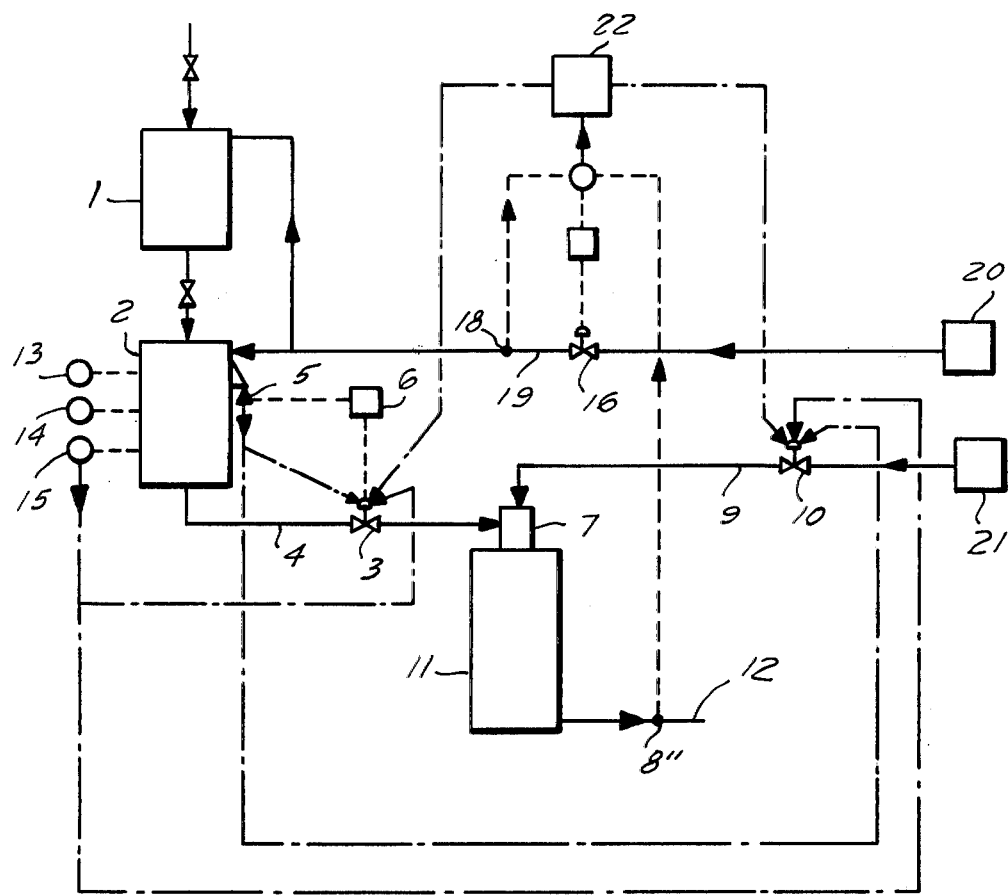

In order to maintain such pressure differences at desired values, it is necessary to measure the various pressures involved. The pressure in the gasifying chamber 11 or at the outlet 12 for gasified combustibles can readily be measured by providing a pressure sensor inside the gasifying chamber 11 (FIG. 2) or in the path of gases leaving chamber 11 through outlet 12 (FIG. 3). It is considered more advantageous, however, to monitor the pressure prevailing upstream of the burner 7 (FIG. 1), such pressure changing more or less in proportion to the pressure in the gasifier. The advantage of measuring the pressure upstream of the burner 7 lies in the fact that the pressure sensors will not be exposed to the high temperatures in the gasifier and will not be susceptible to malfunction by reason of accumulated coal dust deposits on sensors. The pressure of the nitrogen can advantageously be measured in the container 2 itself, but even more advantageously in the third conduit 19 which leads from the source 20 of fluidizing gas to the fluidizing container 2, because in this conduit only pure nitrogen is encountered and damage to the pressure sensor resulting from deposits of coal dust is avoided.

In the embodiment illustrated, a pressure-sensing means 17, of per se conventional design (for instance a transducer composed of a piston slidable in a cylinder and exposed at one side to a first pressure and at the other side to a second pressure and mechanically coupled to the wiper arm of a potentiometer), is provided for sensing the difference between the pressure prevailing at location 8 in the second conduit 9 and location 18 in the third conduit 19. The pressure-sensing means 17 delivers an electrical signal indicative of the pressure difference to a negative-feedback valve control means 20 associated with an electrically controllable adjustable valve 16 provided in the third conduit 19, for controlling the pressure of the fluidizing gas delivered into the fluidizing container. The pressure-difference signal applied to valve control means 20 is compared with another electrical signal indicative of the pressure difference desired to be maintained. Valve control means 20 generates at its output an electrical error signal proportional to the discrepancy between the actual pressure difference and the desired pressure difference. This error signal is applied to electrically controllable adjustable valve 16 and effects valve adjustment in a sense changing the nitrogen pressure to an extent sufficient to restore the pressure difference between locations 8 and 18 to the predetermined value to which valve-control means 20 has been pre-set. It will be appreciated that components 16 and 20 accordingly together constitute pressure-difference stabilizing means. Employing negative-feedback control of the pressure difference in this manner ensures that the pressure of fluidized combustible material entering the gasifier will be sufficiently higher than the pressure of combustion-supporting gas entering the gasifier, and sufficiently higher than the pressure of gases in the gasifier, to prevent back flow of combustion-supporting gas or gasifier gases into the first conduit 4.

In the arrangement illustrated, the pressure difference which is stabilized is the pressure difference between locations 8 and 18, that is, the difference between the pressure of fluidizing gas being furnished to the fluidizing container 2 and the pressure of combustion-supporting gas being furnished to the gasifier. However, it is specifically contemplated, as an alternative possibility, to stabilize the difference between the pressure at location 18 and the pressure of gases leaving the gasifier through outlet 12. This alternative possibility has not been illustrated, because the arrangement required would be identical to that shown, except that one pressure input of unit 17 would be connected to the outlet 12 instead of to the location 8.

The arrangement shown in the FIGURE is further provided with automatic shutdown means 22, to which is supplied the pressure-difference signal generated by pressure-sensing means 17. Normally, the negative-feedback stabilization of the pressure difference between locations 8 and 18 will maintain the pressure difference at the predetermined value to which valve control means 20 has been set. If it should nevertheless happen that the pressure difference between locations 8 and 18 falls below a predetermined minimum acceptable value, it is necessary that the delivery of combustibles and/or the delivery of combustion-supporting gas to the gasifier be immediately terminated, to prevent the possibility of explosion. To accomplish this safeguarding action, automatic shutdown means 22 (which may be a simple Schmitt trigger) determines if and when the pressure-difference signal generated by sensing means 17 reaches a value indicating that the pressure-difference has fallen below the minimum acceptable value. The shut-down means 22 is connected to the valves 3 and 10 and effects complete blocking by these valves of their respective conduit, if the pressure difference does in fact fall below the minimum acceptable value to which unit 22 has been set. It will be clear that components 16–20 and 22 constitute pressure-regulating means in this embodiment.

It will be understood that each of the elements described above, or two or more together, may also find a useful application in other types of constructions differing from the types described above.

While the invention has been illustrated and described as embodied in a method and apparatus for gasifying fluidized finely divided solid combustibles, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various application without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. An arrangement for converting finely divided solid combustible material into gaseous form, comprising, in combination, a first container containing finely divided solid combustible material to be fluidized; a second container containing an inert fluidizing gas incapable of supporting combustion; an inert gas supply conduit having one end connected to said second container for receipt of said gas and having an other end for discharge of said gas and an adjustable regulating valve in said conduit intermediate said ends; fluidizing means having a first inlet connected to said first container for receipt of said material and having a second inlet connected to said other end of said inert gas supply conduit for receipt of said gas, and having an outlet for discharge of the fluidized material; combustion gas supply means operative for supplying a combustion-supporting gas; gasifying means having a first inlet connected to said combustion gas supply means for receipt of said combustion-supporting gas and having a second inlet connected to said outlet of said fluidizing means for receipt of said fluidized material; negative feedback stabilizing means automatically operative for maintaining the pressure of the fluidized combustible material entering said gasifying means higher than the pressure of gas in said gasifying means, to prevent backflow of combustion-supporting gas in said gasifying means through said second inlet of said gasifying means, by automatically adjusting said regulating valve, and thereby varying the flow of inert gas through said inert gas supply conduit, in dependence upon the difference between the pressure of the inert gas in said inert gas supply conduit and the pressure of gas in said gasifying means.

2. An arrangement as defined in claim 1, wherein said negative feedback stabilizing means comprises pressure-difference measuring means operative for sensing the pressure of combustion-supporting gas entering said first inlet of said gasifying means and for sensing the pressure prevailing in said inert gas supply conduit, and operative for determining the difference between the sensed pressures, and means automatically operative when said difference deviates from a preselected value for restoring said difference to said preselected value by adjusting said valve to adjust the flow of said inert gas through said inert gas supply conduit.

3. An arrangement as defined in claim 1, wherein said negative feedback stabilizing means comprises pressure-difference measuring means operative for sensing the pressure of the gas in said gasifying means and for sensing the pressure prevailing in said inert gas supply conduit downstream of said valve and operative for determining the difference between the sensed pressures, and means automatically operative when said difference deviates from a preselected value for restoring said difference to said preselected value by adjusting said value to adjust the flow of said inert gas through said inert gas supply conduit.

4. An arrangement as defined in claim 1, wherein said gasifying means is provided with an outlet for the continual discharge of the gas produced in said gasifying means, and wherein said negative feedback stabilizing means comprises pressure-difference measuring means operative for sensing the pressure of gas discharged through said outlet of said gasifying means and for sensing the pressure prevailing in said inert gas supply conduit downstream of said valve, and means automatically operative when said difference deviates from a preselected value for restoring said difference to said preselected value by adjusting said valve to adjust the flow of said inert gas through said inert gas supply conduit.

5. An arrangement as defined in claim 2, and further including means for terminating the flow of said fluidized material into said gasifying means when said difference drops below a predetermined value.

6. An arrangement as defined in claim 2, and further including means for terminating the flow of said fluidized material into said gasifying means and for also terminating the flow of said combustion-supporting gas into said gasifying means when said difference drops below a predetermined value.

7. An arrangement as defined in claim 3, and further including means for terminating the flow of said fluidized material into said gasifying means when said difference drops below a predetermined value.

8. An arrangement as defined in claim 3, and further including means for terminating the flow of said fluidized material into said gasifying means and for also terminating the flow of said combustion-supporting gas into said gasifying means when said difference drops below a predetermined value.

9. An arrangement as defined in claim 4, and further including means for terminating the flow of said fluidized material into said gasifying means when said difference drops below a predetermined value.

10. An arrangement as defined in claim 4, and further including means for terminating the flow of said fluidized material into said gasifying means and for also terminating the flow of said combustion-supporting gas into said gasifying means when said difference drops below a predetermined value.

11. An method of gasifying a finely divided solid combustible material, comprising the steps of passsing into a fluidizer a finely divided solid combustible material and also through an inert gas supply conduit an inert fluidizing gas incapable of supporting combustion and causing said finely divided solid combustible material to be fluidized in said fluidizer; passing the fluidized solid combustible material into a gasifier; passing a combustion-supporting gas into said gasifier; reacting said fluidized material and said combustion-supporting gas in said gasifier to said produce gaseous combustible material and discharging the produced gaseous combustible material from said gasifier; and maintaining the pressure of the fluidized combustible material entering said gasifier higher than the pressure of gas in said gasifier, to prevent backflow of combustion-supporting gas in said gasifier, by adjusting a regulating valve in said inert gas supply conduit to vary the flow of inert gas into said fluidizer in dependence upon the difference between the pressure of the inert gas entering said fluidizer and the pressure of the gas in said gasifier.

12. A method as defined in claim 11, wherein said step of maintaining comprises continually sensing the pressure of the combustion-supporting gas entering said gasifier and continually sensing the pressure prevailing in said inert gas supply conduit, determining the difference between the sensed pressures, and when said difference deviates from a preselected value restoring said difference to said value by adjusting said valve to vary the flow of inert gas into said fluidizer.

13. A method as defined in claim 11, wherein said step of maintaining comprises continually sensing the pressure of the gas in said gasifier and continually sensing the pressure prevailing in said inert gas supply conduit, determining the difference between the sensed pressures, and when said difference deviates from a preselected value restoring said difference to said value by adjusting said valve to vary the flow of inert gas into said fluidizer.

14. A method as defined in claim 11, wherein said step of maintaining comprises continually sensing the pressure of the gaseous material discharged from said gasifier and continually sensing the pressure prevailing in said inert gas supply conduit, determining the difference between the sensed pressures, and when said difference deviates from a preselected value restoring said difference to said value by adjusting said valve to vary the flow of inert gas into said fluidizer.

15. A method as defined in claim 12, and further including the step of terminating the flow of said fluidized material into said gasifier if said difference drops below a predetermined value.

16. A method as defined in claim 12, and further including the step of terminating the flow of said fluidized material into said gasifier and the flow of said combustion-supporting gas into said gasifier if said difference drops below a predetermined value.

17. A method as defined in claim 13, and further including the step of terminating the flow of said fluidized material into said gasifier if said difference drops below a predetermined value.

18. A method as defined in claim 13, and further including the step of terminating the flow of said fluidized material into said gasifier and also terminating the flow of said combustion-supporting gas into said gasifier if said difference drops below a predetermined value.

19. A method as defined in claim 14, and further including the step of terminating the flow of said fluidized material into said gasifier if said difference drops below a predetermined value.

20. A method as defined in claim 14, and further including the step of terminating the flow of said fluidized material into said gasifier and also terminating the flow of said combustion-supporting gas into said gasifier if said difference drops below a predetermined value.

* * * * *